(12) United States Patent
FrantzDale

(10) Patent No.: US 10,213,966 B2
(45) Date of Patent: Feb. 26, 2019

(54) TECHNIQUES FOR APPLYING A PEEL OPERATION DURING ADDITIVE FABRICATION AND RELATED SYSTEMS AND METHODS

(71) Applicant: Formlabs, Inc., Somerville, MA (US)

(72) Inventor: Ben FrantzDale, Harvard, MA (US)

(73) Assignee: Formlabs, Inc., Somerville, MA (US)

( * ) Notice: Subject to any disclaimer, the term of this patent is extended or adjusted under 35 U.S.C. 154(b) by 590 days.

(21) Appl. No.: 14/830,272

(22) Filed: Aug. 19, 2015

(65) Prior Publication Data

US 2016/0052205 A1    Feb. 25, 2016

Related U.S. Application Data

(60) Provisional application No. 62/039,600, filed on Aug. 20, 2014, provisional application No. 62/039,586, filed on Aug. 20, 2014.

(51) Int. Cl.
| | | |
|---|---|---|
| *B29C 64/20* | (2017.01) | |
| *B33Y 30/00* | (2015.01) | |
| *B29C 67/00* | (2017.01) | |
| *B33Y 10/00* | (2015.01) | |
| *B29C 64/135* | (2017.01) | |

(52) U.S. Cl.
CPC ........ *B29C 67/0066* (2013.01); *B29C 64/135* (2017.08); *B29C 64/20* (2017.08); *B33Y 10/00* (2014.12); *B33Y 30/00* (2014.12)

(58) Field of Classification Search
None
See application file for complete search history.

(56) References Cited

U.S. PATENT DOCUMENTS

| | | | |
|---|---|---|---|
| 9,895,843 B2 * | 2/2018 | Lobovsky | .............. B33Y 10/00 |
| 2008/0174050 A1 | 7/2008 | Kikuchi | |
| 2014/0085620 A1 | 3/2014 | Lobovsky et al. | |
| 2014/0170591 A1 | 6/2014 | El-Siblani | |

(Continued)

FOREIGN PATENT DOCUMENTS

| | | |
|---|---|---|
| WO | WO 2013/026087 A1 | 2/2013 |
| WO | WO 2014/037826 A1 | 3/2014 |
| WO | WO 2015/072921 A1 | 5/2015 |

OTHER PUBLICATIONS

Xuan Song, Yayue Pan, Yong Chen, Development of a low-cost parallel kinematic machine for multi-directional additive manufacturing, Aug. 24, 2013, International SFF Symposium—An Additive Manufacturing Conference, SFF 2013 2013, pp. 297-310.*

(Continued)

*Primary Examiner* — Jeffrey M Wollschlager
*Assistant Examiner* — Armand Melendez
(74) *Attorney, Agent, or Firm* — Wolf, Greenfield & Sacks, P.C.

(57) ABSTRACT

According to some aspects, an additive fabrication device is provided. The additive fabrication device may be configured to form layers of material on a build platform, each layer of material being formed so as to contact a container in addition to the build platform and/or a previously formed layer of material, and may comprise a build platform, a container, and a plurality of mechanical linkages each independently coupled to the container and configured to move the container relative to the build platform.

14 Claims, 11 Drawing Sheets

(56) References Cited

U.S. PATENT DOCUMENTS

| | | |
|---|---|---|
| 2014/0191442 A1 | 7/2014 | Elsey |
| 2015/0064298 A1 | 3/2015 | Syao |
| 2015/0183168 A1 | 7/2015 | Liverman et al. |
| 2015/0231828 A1 | 8/2015 | El-Siblani et al. |
| 2016/0016361 A1 | 1/2016 | Thomas et al. |
| 2016/0046080 A1 | 2/2016 | Thomas et al. |
| 2016/0129645 A1 | 5/2016 | Wighton et al. |

OTHER PUBLICATIONS

International Search Report and Written Opinion for PCT/US2015/040246 dated Oct. 16, 2015.

Zhou et al., Digital material fabrication using mask-image-projection-based stereolithography. Rapid Prototyping J; (2013) vol. 19, No. 3: pp. 153-165.

Fichter, A Stewart Platform-Based Manipulator: General Theory and Practical Construction, The International Journal of Robotics Research, Jun. 1986, vol. 5, No. 2, pp. 157-182.

Kohli et al., Manipulator Configurations Based on Rotary-Linear (R-L) Actuators and Their Direct and Inverse Kinematics, ASME Journal of Mechanisms, Transmissions, and Automation in Design, 1988, vol. 110, pp. 397-404.

Liu et al., Kinematic Analysis of a Stewart Platform Manipulator, IEEE Transactions on Industrial Electronics, Apr. 1993, vol. 40, No. 2, pp. 282-293.

Nanua et al., Direct Kinematic Solution of a Stewart Platform, IEEE Transactions on Robotics and Automation, Aug. 1990, vol. 6, No. 4, pp. 438-444.

Pierrot et al., Delta: A Simple and Efficient Parallel Robot, Robotica, 1990, vol. 8, pp. 105-109.

Pierrot et al., Toward a Fully Parallel 6 DOF Robot for High-Speed Applications, 1991, Proc. of the IEEE International Conference on Robotics and Automation, pp. 1288-1293.

Stewart, A Platform with Six Degrees of Freedom, Proc. Institute of Mechanical Engineering, London, England, 1965, vol. 180, pp. 371-386.

International Preliminary Report on Patentability for International Application No. PCT/US2015/040246 dated Jan. 26, 2017.

[No Author Listed] Evidence of on sale prior to Dec. 2013. Obtained from the internet at the following address http://forum.formlabs.com/t/tray-tilt-didnt-come-back-to-level/728.

Extended European Search Report for European Application No. 15822762.9 dated Feb. 20, 2018.

U.S. Appl. No. 14/333,885, filed Jul. 17, 2014, Thomas et al.

U.S. Appl. No. 14/462,551, filed Aug. 18, 2014, Thomas et al.

\* cited by examiner ly to systems and
methods for separating a part from a surface during additive
fabrication, e.g., 3-dimensional (3D) printing.

TECHNIQUES FOR APPLYING A PEEL OPERATION DURING ADDITIVE FABRICATION AND RELATED SYSTEMS AND METHODS

CROSS REFERENCE TO RELATED APPLICATIONS

The present application claims the benefit under 35 U.S.C. § 119(e) of U.S. Provisional Patent Application No. 62/039,586, filed Aug. 20, 2014, titled "Offset Hinge Peel with Improved Sliding Component," and U.S. Provisional Patent Application No. 62/039,600, filed Aug. 20, 2014, titled "Improved Peel Using Linkages," both of which are hereby incorporated by reference in their entireties.

FIELD OF INVENTION

The present invention relates generally to systems and methods for separating a part from a surface during additive fabrication, e.g., 3-dimensional (3D) printing.

BACKGROUND

Additive fabrication, e.g., 3-dimensional printing, provides techniques for fabricating objects, typically by causing portions of a building material to solidify at specific locations. Additive fabrication techniques may include stereolithography, selective or fused deposition modeling, direct composite manufacturing, laminated object manufacturing, selective phase area deposition, multi-phase jet solidification, ballistic particle manufacturing, particle deposition, laser sintering or combinations thereof. Many additive fabrication techniques build parts by forming successive layers, which are typically cross-sections of the desired object. Typically, each layer is formed such that it adheres to either a previously formed layer or a substrate upon which the object is built.

In one approach to additive fabrication, known as stereolithography, solid objects are created by successively forming thin layers of a curable polymer resin, typically first onto a substrate and then one on top of another. Exposure to actinic radiation cures a thin layer of liquid resin, which causes it to harden and adhere to previously cured layers or the bottom surface of the substrate.

SUMMARY

Systems and methods for separating a part from a surface during additive fabrication are provided.

According to some aspects, an additive fabrication device is provided configured to form layers of material on a build platform, each layer of material being formed so as to contact a container in addition to the build platform and/or a previously formed layer of material, comprising a build platform, a container, and a plurality of mechanical linkages each independently coupled to the container and configured to move the container relative to the build platform.

According to some aspects, a method of additive fabrication is provided wherein a plurality of layers of material are formed on a build platform in a build direction, each layer of material being formed so as to contact a container in addition to the build platform and/or a previously formed layer of material, comprising forming at least a first layer of material, and subsequent to the forming of the first layer of material, moving the container relative to the build platform such that the first layer separates from the container using a plurality of mechanical linkages each independently coupled to the container.

The foregoing is a non-limiting summary of the invention, which is defined by the attached claims.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

DETAILED DESCRIPTION

Systems and methods for separating a part from a surface during additive fabrication are provided. As discussed above, in additive fabrication a plurality of layers of material may be formed on a substrate, such as a build platform. In some additive fabrication devices, one or more of the layers of the material may be formed so as to be in contact with a surface other than another layer or the build platform. For example, some stereolithographic techniques may form a layer of solid material by curing liquid resin, such that the layer of solid material is in contact with a container holding the liquid resin.

Figure 1A:
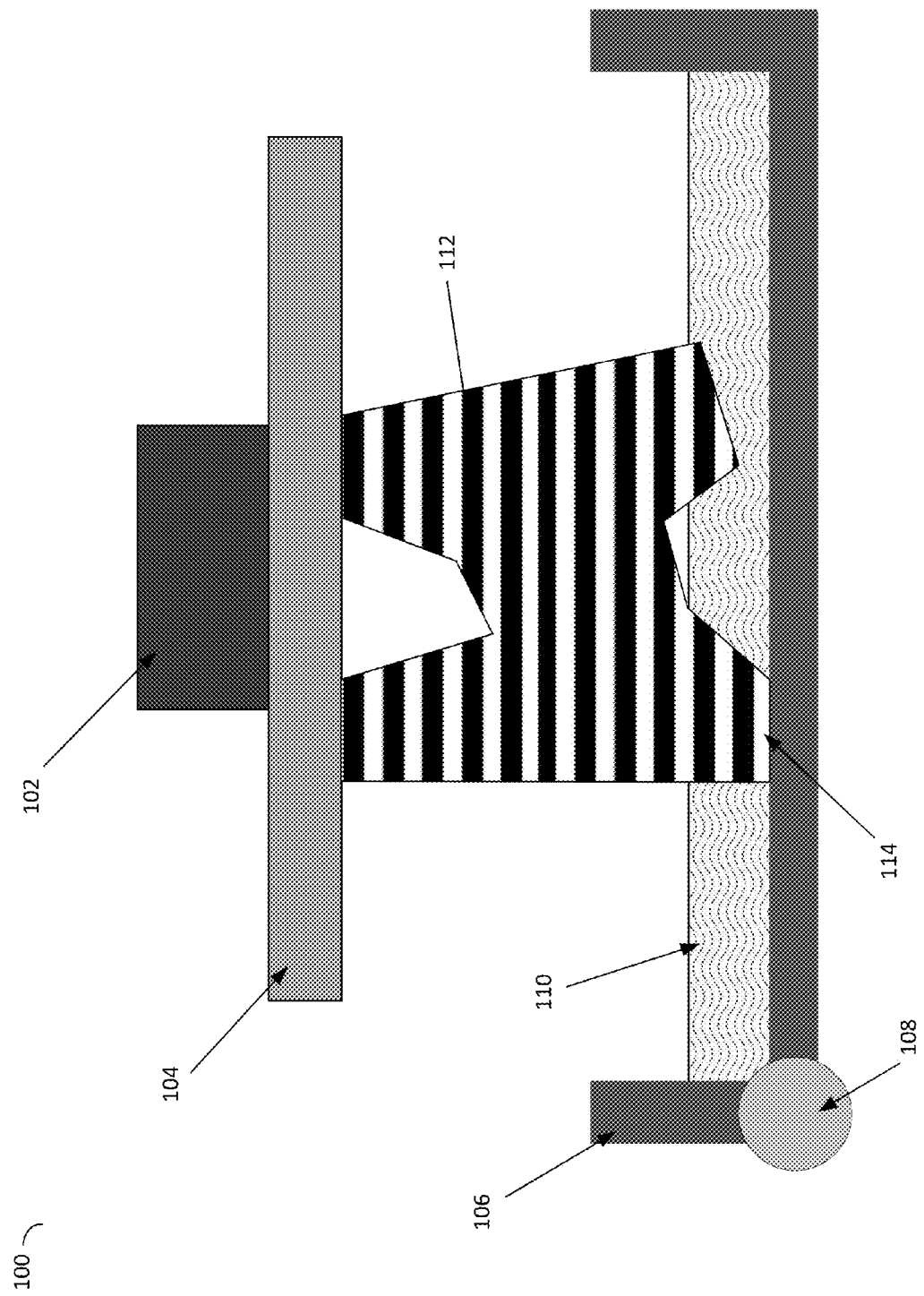
FIGS. 1A-1B provides a schematic view of a stereolithographic printer perfuming a peel operation, according to some embodiments.
Figure 1B:
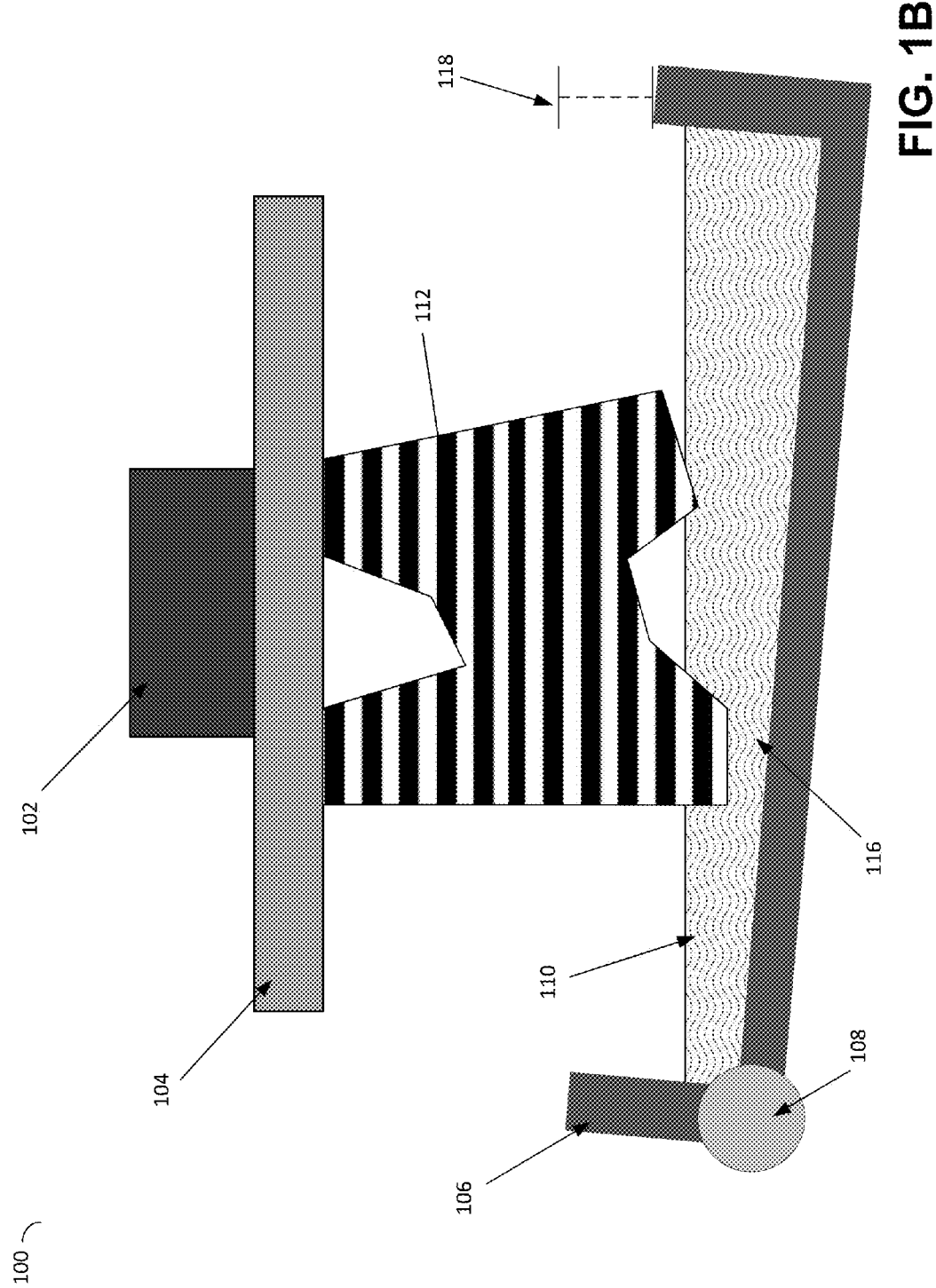

To further describe one such additive fabrication technique in which a part is formed in contact with a surface other than another layer or the build platform, an inverse stereolithographic printer 100 is depicted in FIGS. 1A and 1B. Illustrative stereolithographic printer 100 forms a part in a downward facing direction on a build platform such that layers of the part are formed in contact with a surface of container 106 in addition to either a previously cured layer or to the build platform. In the example of FIGS. 1A and 1B, stereolithographic printer 100 comprises build platform 104, container 106, axis 108 and liquid resin 110. The downward facing build platform 104 opposes the floor of container 106, which is filled with a photopolymer resin 110.

As shown in FIGS. 1A and 1B, a part 112 may be formed layerwise, with the initial layer attached to the build platform 104. In the example of FIGS. 1A and 1B, the most recently formed layer is layer 114, which is formed in contact with both the previously formed layer and the container 106. In some implementations, the container may be at least partially transparent to actinic radiation, such that the radiation can be targeted through the container at portions of the thin layer of liquid photocurable resin resting on the floor of the container. Exposure to the actinic radiation cures a layer of the liquid resin (e.g., thereby forming layer 114), which causes it to harden. The newly formed layer is at least partially in contact with both a previously formed layer and the surface of the container 106 when it is formed. The top side of the cured resin layer typically bonds to either the surface of the build platform 104 or with the previously cured resin layer in addition to the transparent floor of the container (depending on whether the layer is the first layer to be formed or not). In some cases, one or more portions of the surface (or the entire surface) of layer 114 may adhere to the container such that the adhesion must be removed prior to formation of a subsequent layer. However, in order to form additional layers of the part subsequent to the formation of layer 114, any bonding that occurs between the transparent floor of the container and the layer must be broken.

Techniques for reducing the strength of this bond may include inhibiting the curing process and/or providing a highly smooth surface on the inside of the container. In many use cases, however, at least some force must be applied to remove the cured resin layer from the container floor. For example, a force may be applied by rotating the container about axis 108 to mechanically separate the container from the part 112. This approach is depicted in FIG. 1B.

As shown in FIG. 1B, stereolithographic printer 100 has been rotated about axis 108 in order to separate part 112 from the container 106, thereby displacing an end of the container distal to the fixed axis a distance 118. Rotating the container 106 away from the part 112 may be followed by a rotation of the container back toward the part. In some implementations, the build platform 104 may also move away from the container to create a space for a new layer of liquid resin to form between the part and the container. Subsequent to this motion, a new layer of liquid resin is available in the container, which may be cured and thereby added to the part being formed. Each step of the aforementioned curing and separating processes may continue until the part is fully created.

However, multiple problems may arise due to the application of force during the above-described processes. For example, in some use cases a force may be applied to and/or through the part itself. A force applied to the part may, in some use cases, cause the part to separate partially or completely from the build platform, rather than the container, which will disrupt the fabrication process. In some use cases, a force applied to the part may cause deformation or mechanical failure of the part itself without necessarily separating the part from the build platform. For instance, the force may bend or break regions of the part that were previously formed.

The inventors have recognized and appreciated that the above-described problems with peeling operations may be mitigated by controlling the directions of forces applied to the part during the peeling operation. A peeling operation as described herein may comprise both or either of: a separation force perpendicular to a direction in which layers are formed during fabrication (which may be referred to as a "sliding" force) and/or a separation force parallel to a direction in which layers are formed during fabrication (which may be referred to as a "pulling" force). The peeling operation may utilize any suitable combination of sliding and/or pulling forces so that the resultant force(s) separate a part from a surface without producing the above-described disruptions to the fabrication process.

By applying sliding forces, particularly in combination with pulling forces, a part may be separated from the container more easily and with less risk of deforming the part than with the conventional peeling operation described above in relation to FIGS. 1A and 1B. "Separation" of a part from a surface, as used herein, refers to the removal of adhesive forces connecting the part to the surface. It may therefore be appreciated that, as used herein, a part and a surface may be separated via the techniques described herein, though immediately subsequent to the separation may still be in contact with one another (e.g., at an edge and/or corner) so long as they are no longer adhered to one another.

According to some embodiments, an additive fabrication device may include one or more mechanical linkages that apply forces to a part during the peeling operation. According to some embodiments, one or more mechanical linkages may be attached to a container, thereby constraining the motion of the container such that forces applied to the container (from the linkages or otherwise) cause a combination of pulling and sliding forces to be applied to the container. According to some embodiments, one or more mechanical linkages may be coupled to a container and actuated such that a wide range of forces, including pulling and/or sliding forces, may be applied to a part in contact with the container. For instance, mechanical linkages may be actuated to rotate a container about an axis parallel to the build direction and/or may be actuated to move at least a portion of the container in a direction parallel to the build direction. A combination of movements generated by mechanical linkages coupled to a surface may thereby produce a desired combination of sliding and/or pulling forces on a part in contact with a surface.

As used herein, a "coupling" between a mechanical linkage and a component, such as a container, refers to a mechanical attachment of a part of the linkage to the component such that the attached part of the linkage co-moves with the component. The attachment may be direct, such as by mechanically fastening the linkage to the component; or may be indirect, such as by mechanically fastening the linkage to another component that is attached to the component. For instance, a mechanical linkage may be coupled to a container by fastening the linkage to the container (direct coupling) or by fastening the linkage to a frame that holds the container (indirect coupling). In either case, motion of the mechanical linkage at the point of attachment of the linkage to either the container or frame, respectively, will cause the container to co-move with the linkage at the point of attachment.

According to some embodiments, an additive fabrication device may include one or more mechanical linkages coupled to a component wherein the linkages may each be independently actuated to produce movement of the component. For instance, a linkage may include one or more linear actuators that may be operated to increase or decrease the length of the linkage, and/or a linkage may include one or more rotational actuators that may be operated to adjust the relative angle between the linkage and the component. In some implementations, the linkages may be arranged to form a Stewart platform.

According to some embodiments, an additive fabrication device may include a rotational axis offset from a plane of a working surface (e.g., the base of a container in a stereolithographic device, such as device 100 shown in FIGS. 1A-1B). Rotation of the working surface about the axis may apply both sliding and pulling forces to a part in contact with the working surface due to the relative locations of the axis and working surface.

Following below are more detailed descriptions of various concepts related to, and embodiments of, systems and methods for separating a part from a surface during additive fabrication. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

Although particular systems and methods for additive fabrication are described and shown herein, it is envisioned that the functionality of the various disclosed techniques for separating a part from a surface may be applied to any now known or hereafter devised additive fabrication technique that forms material in contact with a surface from a precursor material such as, but not limited to, a liquid photopolymer or a powdered material. For instance, as discussed above, a stereolithography technique may be used to form solid material from a liquid photopolymer. However, the techniques for separating a part from a surface as described herein may also be applied to, for instance, a powdered material in a selective laser sintering (SLS) device, or within any other additive fabrication technique wherein a solid material is formed in contact with a surface.

Figure 2A:
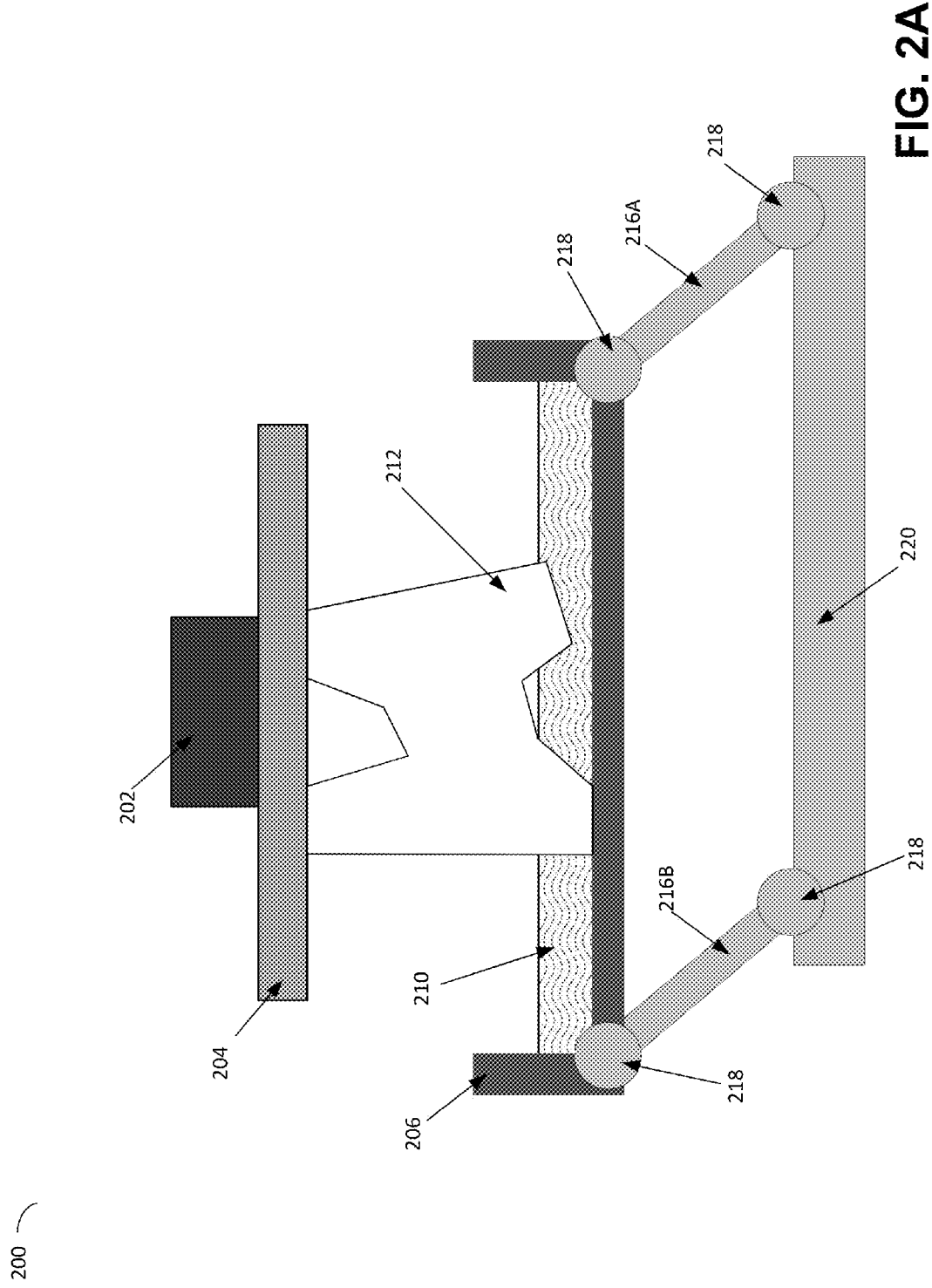
FIGS. 2A-2B depict an illustrative stereolithographic device that includes a planar four-bar linkage, according to some embodiments.
Figure 2B:
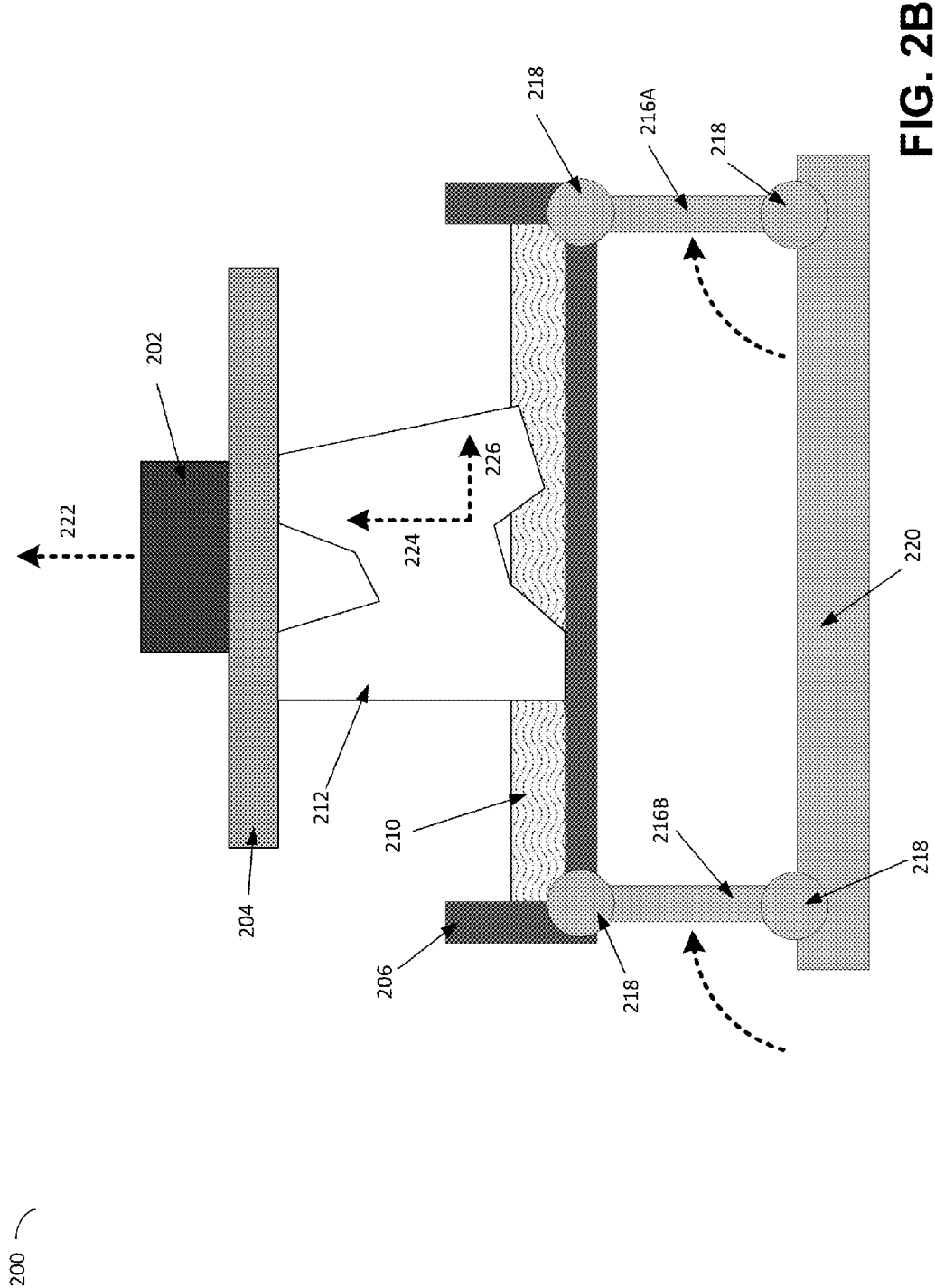

FIGS. 2A and 2B depict an illustrative stereolithographic device that includes a planar four-bar linkage, according to some embodiments. In the example of FIGS. 2A-2B, illustrative stereolithographic device 200 includes a resin container 206 mounted, either directly or indirectly, to a frame 220 via mechanical linkages 216A and 216B. The linkages are attached to the container and to the frame via joints 218. The frame, rockers, and container form a structure sometimes referred to as a parallelogram linkage, wherein the container 206 serves to couple mechanical linkages 216A and 216B together. Container 206 holds, for example, a photopolymer resin 210. For clarity, the layers of part 212 are not depicted in FIGS. 2A-2B.

Joints 218 may be formed using any suitable rotatable coupling, including but not limited to the use of rotating hinge(s), axle(s), flexure(s), sliding structure(s), or combinations thereof. Such joints 218 may move freely, be spring-loaded, and/or may be coupled to one or more actuators such that motive force for the linkage is provided through one or more joints 218. Alternatively, or in addition, actuators may be connected in any suitable way to the resin container 206 directly or, as described below, through the part 212.

In the example of FIGS. 2A-2B, the lengths of mechanical linkages 216A and 216B may constrain the motion of the resin container 206 in two dimensions. As will be appreciated, the motion of the resin container 206 may, in at least some implementations, be further constrained in various ways, including by use of a second parallelogram linkage on the opposing side of the resin container 206, thus constraining the motion in three dimensions. In some embodiments, it may be advantageous to limit the range of motion of the resin container 206 and/or the mechanical linkages 216A and 216B by use of one or more end stops, restrictions in the joints 218, and/or other appropriate techniques. In the example depicted in FIG. 2A, for instance, the resin container 206 may be constrained such that it cannot move down (i.e., directly away from the build platform) in response to the build platform 204 and part 212 being pushed down upon the resin container 206. As shown in FIG. 2B, the upwards motion of the resin container 206 may be constrained directly by the length of the mechanical linkages 216A and 216B.

The peeling operation depicted in FIGS. 2A and 2B will now be described with reference to the general process of part formation. FIG. 2A represents an initial configuration of the illustrative additive fabrication device during, or immediately after, actinic radiation exposure and subsequent formation of an additional layer 214 to part 212. As such, the newly formed layer 214 may be at least partially bonded to the floor of the resin container 206. Following the exposure step, this newly formed layer 214 must be separated to allow additional layers to form.

In the example of FIGS. 2A-2B, the newly formed layer 214 is separated by lifting the build platform 204 (and thus the part 212 and newly formed layer 214) upwards in a direction parallel to the build direction, shown in FIG. 2B as upwards force 222. As a result of the bond between the newly cured layer 214 to the resin container 206, a portion of this upwards force 222 may be applied through the part and to the resin container. If the adhesive force of the newly cured layer 214 is less than the initial resistance of the resin container 206 due to gravity, friction, and/or other opposing forces such as springs, the newly cured layer 214 may release from the floor of the resin container 206 and formation of additional layers may begin.

Alternatively, if the adhesive force of the newly cured layer 214 is equal or greater than the initial resistance of the resin container 206 due to gravity, friction, and/or other opposing forces, the upwards force 222 may be transmitted through the newly cured layer 214 through the part 212, causing the resin container 206 to respond to the force applied. The resulting motion of the resin container 206 is constrained by the geometry of the mechanical linkages, including the linkages 216 and couplings formed by the frame 220 and resin container 206. In particular, the parallelogram linkage example depicted may tend to constrain the motion of the resin container 206 and force it to move both up and to the right in response to the upwards force 222, as shown by the sequence of positions in FIGS. 2A and 2B. This motion may thus exert forces on the newly adhered layer 214 of both a "pulling" 224 and "sliding" 226 nature, the combination of which has been observed by the inventors to be advantageous for separation of the part from the container with reduced part distortion or part breakage.

In some embodiments, forces used to separate the part 212 from the container 206 may be generated entirely from the motion of the build platform, without the need for additional force generators to be coupled directly to the resin container 206. Such a "passive" peel may be advantageous in certain situations where fewer force generators are desired. In particular "passive" peel systems that utilize techniques described herein may avoid several defects common in passive peel systems, such as the need for substantial forces for larger surface areas, uneven application of separation forces, application of unwanted compressive forces, and/or other distorting effects. In some embodiments, however, as discussed above, one or more actuators may be coupled to the resin container 206, whether via a direct connection to the resin container 206 or via one or more force generators connected to the mechanical linkages 216A-B.

According to some embodiments, the example of FIGS. 2A and 2B may be modified to allow for alternative motions which may also be advantageous for the separation of a part following the formation of a new layer. For instance, the lengths of mechanical linkages 216A and 216B, the length of frame 220, and/or the initial angles at joints 218 may be adjusted in order to alter the motion of the four-bar linkage depicted. The equal length mechanical linkages 216A and 216B in the example of FIGS. 2A-2B provide for a motion wherein the resin container 206 is maintained parallel to the frame 220 and the build platform 204. By substituting mechanical linkages of unequal lengths, for example, such as if mechanical linkages 216A were shorter than mechanical linkages 216B, an alternative motion may be generated which incorporates many of the rotational characteristics of other "peeling" systems, while also providing for pulling and sliding forces.

Figure 3:
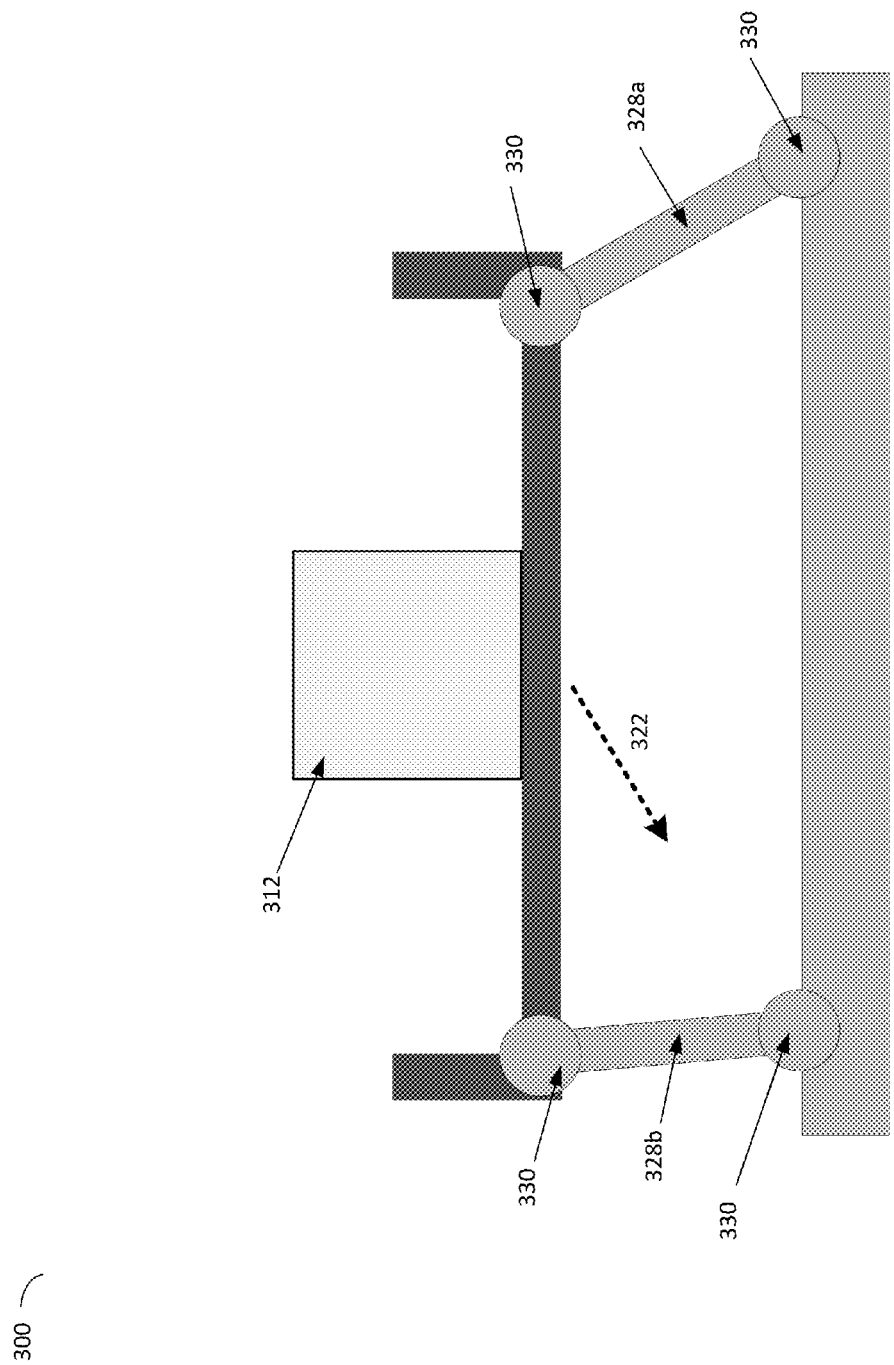
FIG. 3 illustrates a set of mechanical linkages with adjustable lengths, according to some embodiments.

As an example of such a configuration, FIG. 3 illustrates a set of mechanical linkages with adjustable lengths, according to some embodiments. In the example of FIG. 3, the configuration of mechanical linkages 328a and 328b, as well as the lengths of frame 320 and joints 330, create an instantaneous force 322 that may be directed in any suitable direction by adjusting the relative lengths of the mechanical linkages, the frame and/or the relative angles of the joints. As may be appreciated, any suitable magnitude or force in any suitable direction may be produced by altering one of more of the dimensions of mechanical linkages shown in the example of FIG. 3. In particular, an instantaneous force 322 produced may be similar, or identical to, an instantaneous force that would be created by rotation about the point defined by the intersection of lines extending in the initial directions of mechanical linkage 328a and mechanical linkage 328b.

According to some embodiments, an additive fabrication device may include mechanical linkages of variable length, such as may be created through the use of linear actuators, hydraulic cylinders, and/or other appropriate techniques. For instance, by replacing mechanical linkages 216A and 216B depicted in FIGS. 2A and 2B with variable length linkages, some embodiments may synthesize a wide variety of possible motions and applications of force, with partial or full degrees of freedom, depending on the needs of the particular part and peeling operation.

According to some embodiments, mechanical systems known as parallel manipulators (also sometimes called "generalized Stewart platforms"), and related modifications and improvements may be used to mount a container onto an end effector of the platform. The inventors have recognized and appreciated that using such manipulators, a container may be mounted and moved in arbitrary degrees of freedom via digital control. Some embodiments may thereby apply instantaneous forces to cause separation with a wide range of directions and magnitudes, as well as dynamically varying the direction and magnitude of forces throughout a peeling operation. Such a configuration may advantageously allow for the ongoing optimization of the forces applied during the peeling operation based on differing characteristics of parts, build materials, and build styles, including during the testing, development, and end use of an additive fabrication device.

Figure 4A:
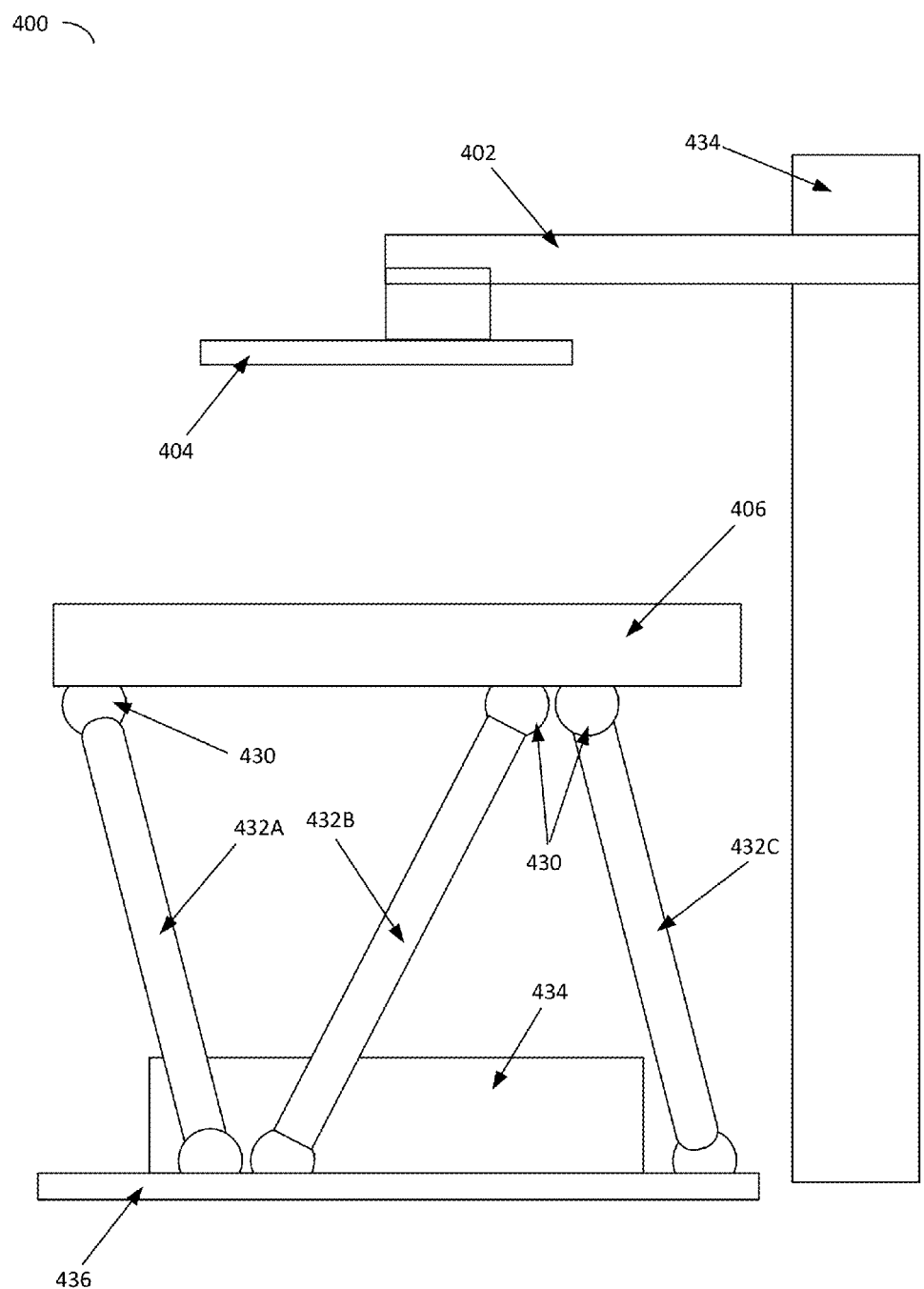
FIGS. 4A-B illustrate an additive fabrication device based on a parallel manipulator design, according to some embodiments.
Figure 4B:
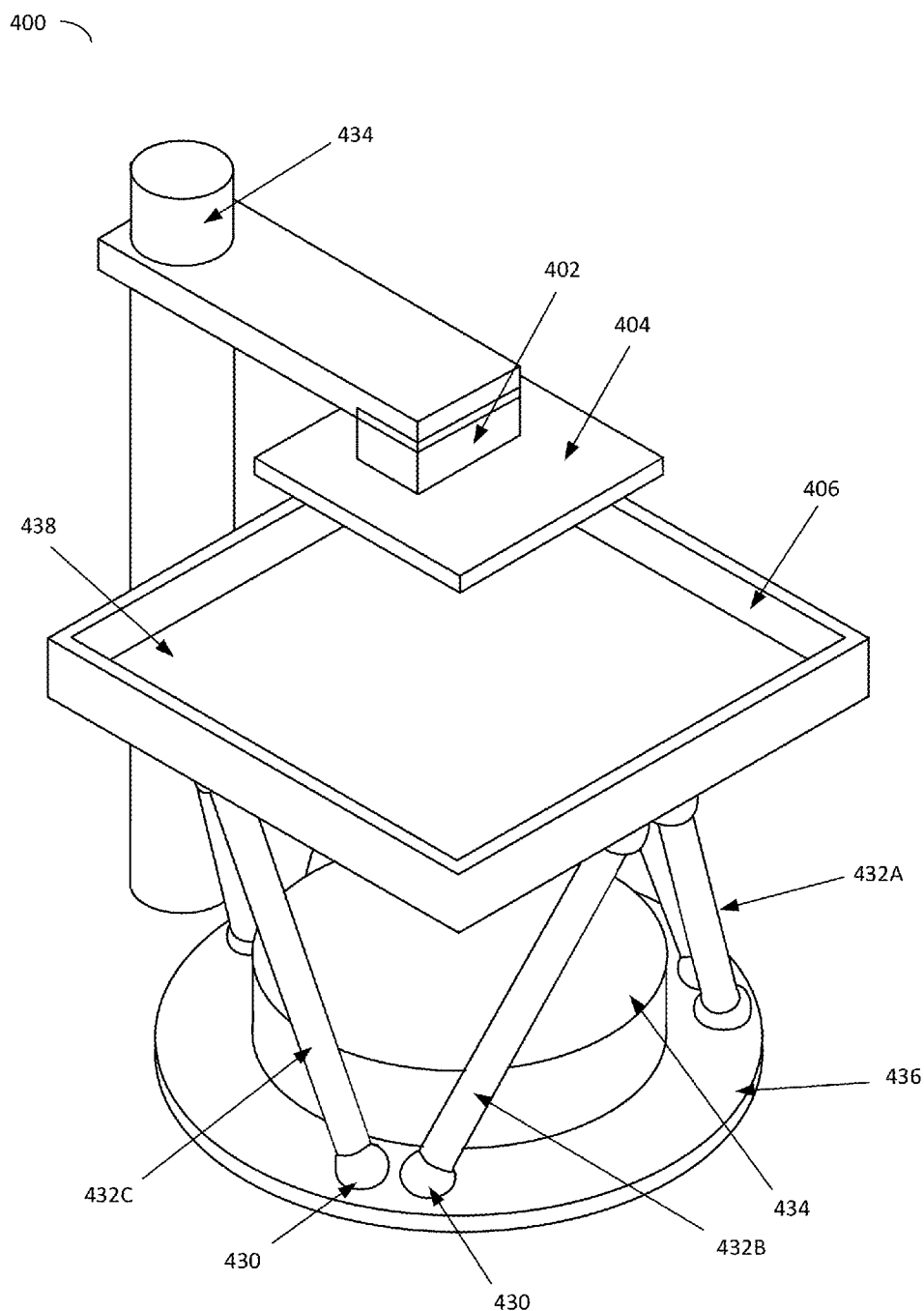

FIGS. 4A-B illustrate an additive fabrication device based on a parallel manipulator design, according to some embodiments. FIGS. 4A and 4B illustrate side and isometric views, respectively. In the example of FIGS. 4A-4B, a build platform 404 is suspended from a carrier arm 402, which may be raised or lowered on build axis 434 using any one of a number of devices suitable for that purpose, such as a stepper motor coupled to a screw and/or with any another suitable actuator. A resin container 406 is mounted onto a base plate 436 by means of six mechanical linkages, three of which are visible in FIG. 4A as 432A, 432B, and 432C. The mechanical linkages 432 are connected to the base plate 436 and resin container 406 by means of joints 430. Resin in the resin container 406 may be exposed to actinic radiation emitted from a source 434.

As discussed above, mechanical linkages 432 connected to a container may comprise a mechanical device sometimes referred to a "Stewart platform." According to some embodiments, each of the mechanical linkages 432 may include one or more actuators configured to be independently controlled. Such control may include adjusting the length of the mechanical linkage (e.g., using a linear actuators) and/or adjusting the orientation of the linkage relative to the container 406 and/or base plate 436 (e.g., using a rotational actuator, such as one within either or both joints 430 connected to the linkage).

Actuators may be formed in any one of a number of appropriate ways, including by use of hydraulic cylinders, linear actuators, or other techniques. In some implementations, one or more actuators may be passive legs such that motive force is applied by other means, including rotational force generators associated with joints 430, such as may be provided via rotational servos or other techniques known in the art.

During operation of illustrative additive fabrication device 400, layers may be formed as described above in relation to FIGS. 1A-1B. When separation of a newly cured layer of a part (not shown) is performed, the length of actuators 432 may be altered by a control system in order to subject the part to the desired forces, such as sliding, pulling, peeling, or twisting forces. Any suitable technique may be applied to determine appropriate lengths and configurations of actuators in order to bring about approximations of the desired motion. In some embodiments, an inverse kinematic transformation for a given geometry may be performed using any one of a number of techniques so as to translate a desired Cartesian position and orientation of the resin container into desired actuator lengths.

In some embodiments, a reduced or limited form of a generalized Stewart platform may be employed, particularly to the extent that only more limited degrees of freedom may be desired. As one example, a limited number of linear actuators may be included in an additive fabrication device and configured so as to allow the orientation, but not the position, of a container to be varied. Such an approach may allow for a wide range of rotational peeling forces to be applied and, when combined with other motions in the system such as pulling forces created by lifting a build platform, may allow for a range of translational forces to also be applied.

As another example, a limited number of linear actuators may be included in an additive fabrication device and configured so as to allow the position, but not the orientation, of a container to be varied. Such an approach may allow for a wide range of sliding and pulling forces to be applied. However, in general any suitable configuration of linear actuators may be used as the invention is not limited in this respect. Moreover, while the preceding discussion has focused on the attachment of a container to mechanical linkages, including parallel manipulators, it should be appreciated that the above techniques may also be employed to manipulate the build platform and/or part, while leaving the container stationary. As may be appreciated, the application of motion in this way may result in equivalent forces from the reference frame of the part and the layer of newly cured resin.

As discussed above, according to some embodiments, a combination of sliding and/or pulling forces may be applied to a part in contact with a working surface by rotating the working surface about an axis offset from a plane of the working surface. In order to demonstrate such an approach, FIG. 5 depicts a simplified example of instantaneous forces that may be applied to a part 512 at the beginning of a peeling operation.

Figure 5:
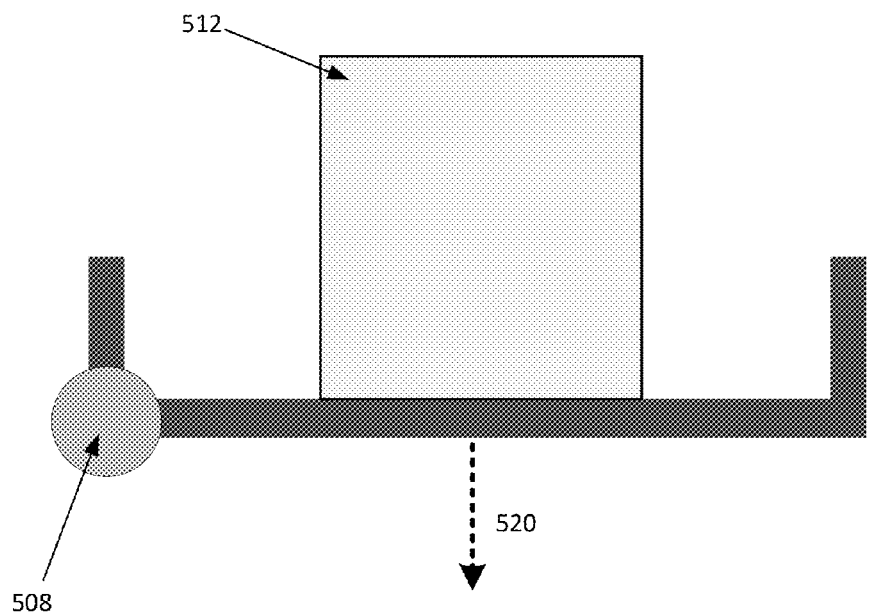
FIG. 5 depicts an example of instantaneous forces that may be applied to a part at the beginning of a peeling operation, according to some embodiments.

In the example of FIG. 5, as container 506 rotates about the fixed axis 508, instantaneous force 520 is applied to the part 512 in the same direction as a direction normal of the bottom of the resin container. Consequently, in the example of FIG. 5, there are only minimal sliding forces applied to the part in a direction parallel to the direction in which additional layers are formed.

Figure 6B:
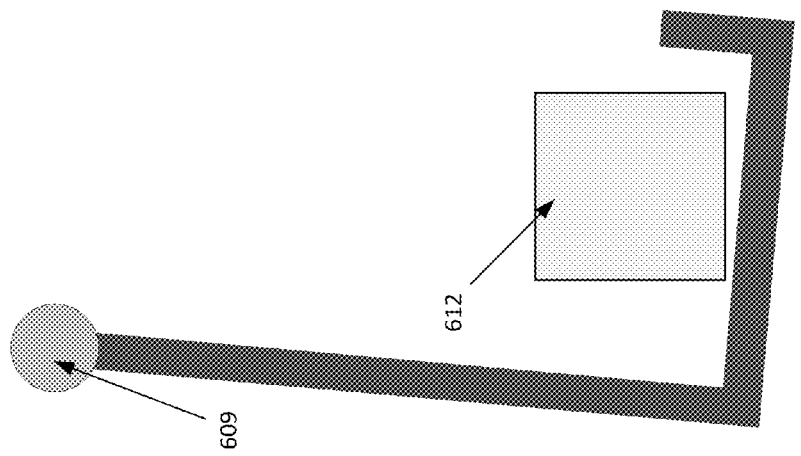
FIGS. 6A-6B depict an application of instantaneous forces during a peeling operation that includes a sliding component, according to some embodiments.
Figure 6A:
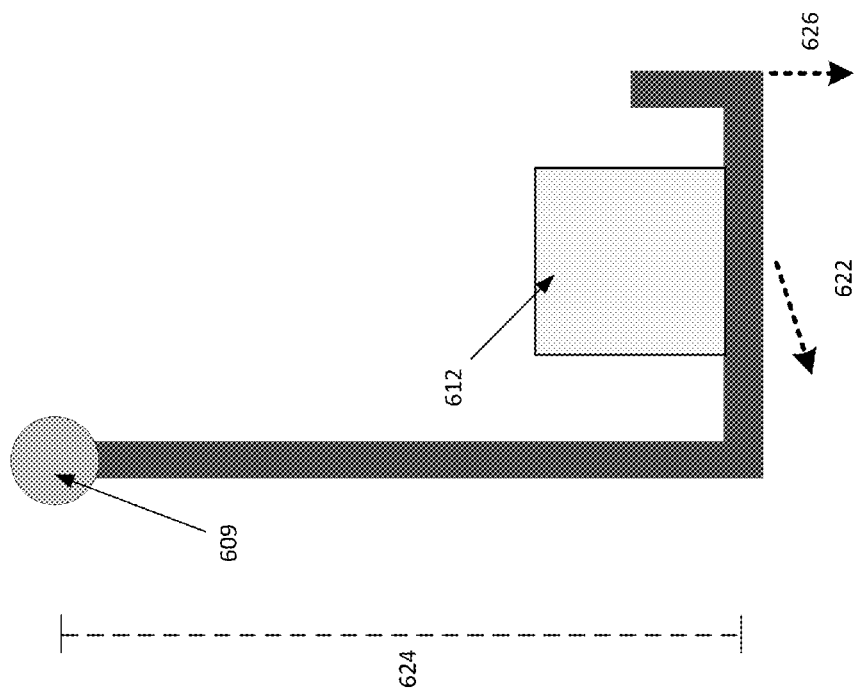

FIGS. 6A-6B depict an application of instantaneous forces during a peeling operation that includes a sliding component, according to some embodiments. As shown in FIG. 6A, an offset peel axis 609 is offset a distance 624 from the base of the container. When a rotational force 626 is applied to the resin container, the resin container rotates about the offset peel axis 609, as shown in FIG. 6B. This rotation causes an instantaneous force 622 to be applied to the part 612 at the beginning of the rotation. As can be seen from FIG. 6A, the direction of the instantaneous force 622 may be directed in a non-normal direction to the container and may thereby include a sliding component of force in addition to a pulling component of force.

The direction of the instantaneous force 622 applied may be selected to be any appropriate value by selecting the offset distance 624 appropriately. For example, as distance 624 becomes larger, the direction of force 622 may tend more toward the horizontal (parallel to the base of the container). Accordingly, a size of the container and an offset of the peel axis from the base of the container may be set relative to one another based on a desired direction of the force applied during rotation of the container about the peel axis. In the example shown in FIG. 6A, the instantaneous force vector 622 at a given point extends orthogonally out from the line connecting that point and the center of rotation about the offset peel axis 609.

Figure 7:
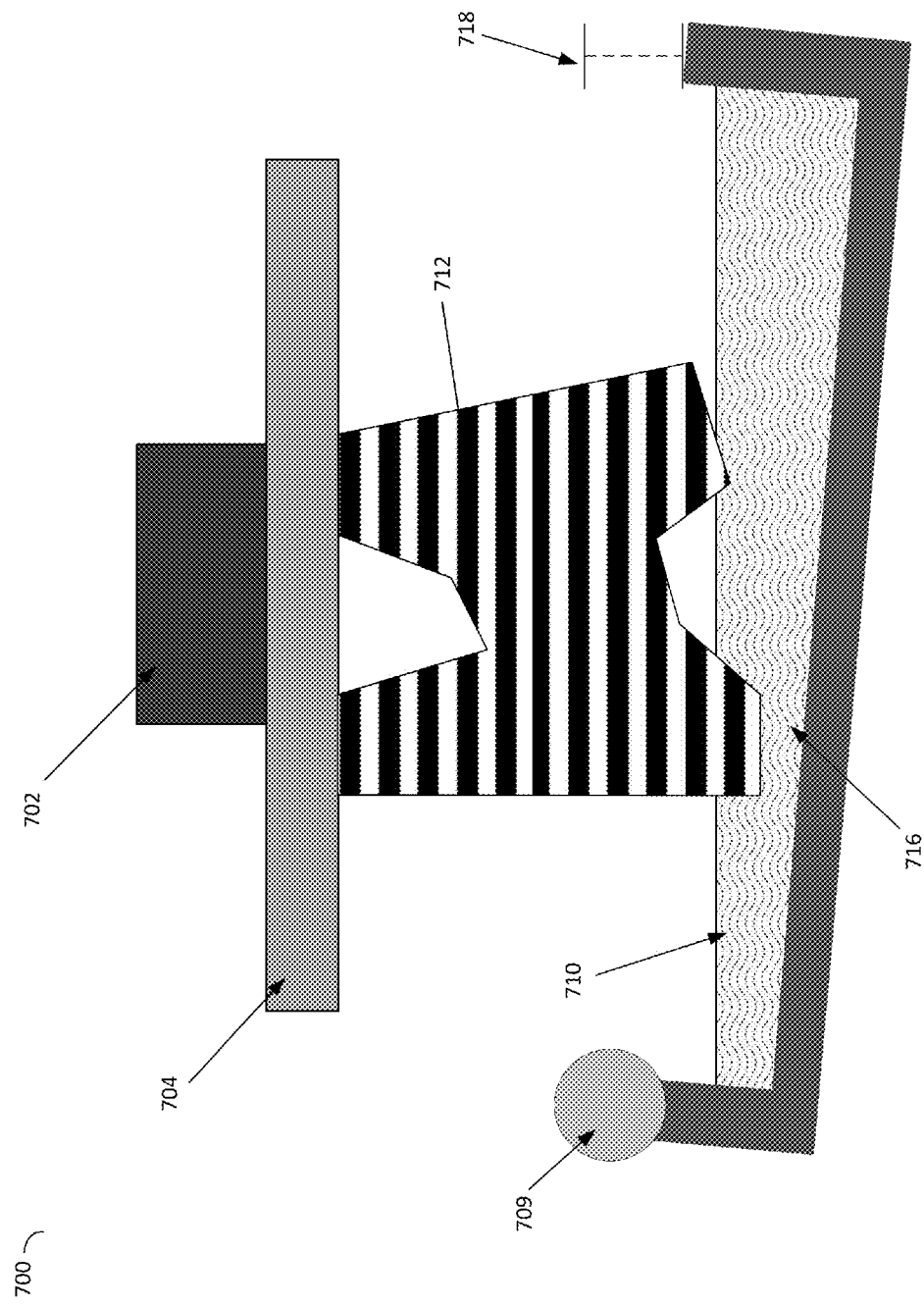
FIG. 7 depicts an example of an offset peel axis in an illustrative stereolithographic device, according to some embodiments.

FIG. 7 depicts an example of an offset peel axis in an illustrative stereolithographic device, according to some embodiments. In the example of FIG. 7, an offset peel axis 709 is used, which is offset from the plane of the bottom working surface of the container 706. The container 706 may be rotated about the offset peel axis 709 in any appropriate way, including by the application of force to the edge of the container 706 opposite from the offset peel axis 709 or by direct application of rotational force to the offset peel axis 709. When rotated about the offset peel axis 709, the container 706 may move down and towards the left of the figure relative to the part 712. Such motion may advantageously apply both a pulling force component and a sliding force component to the newly cured layer 714, thereby breaking a mechanical bond between part 712 and the container 706. The offset peel axis 709 may be located at any distance offset from the plane of the bottom working surface of the resin container 706.

Figure 8:
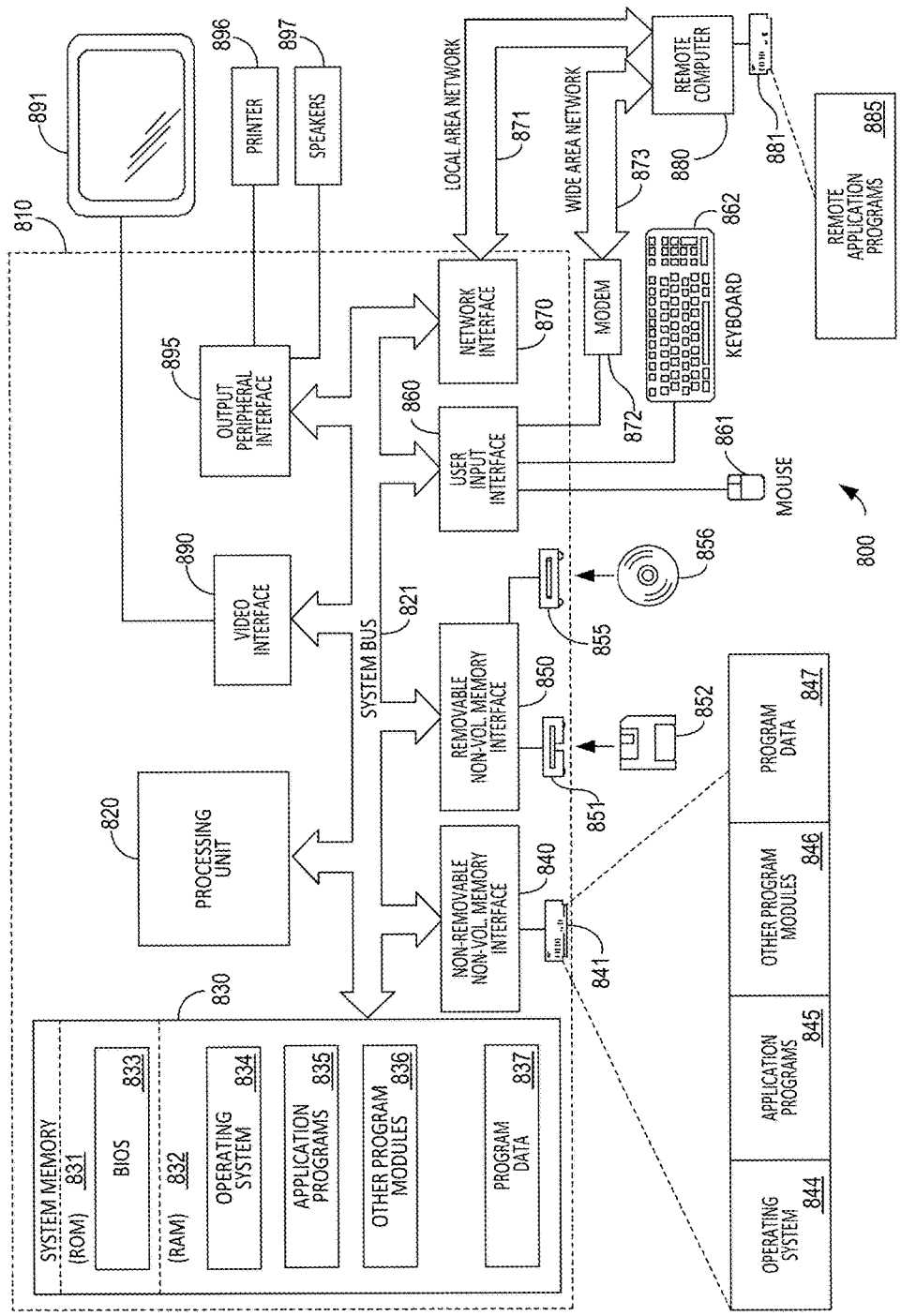
FIG. 8 illustrates an example of a computing system environment on which aspects of the invention may be implemented.

FIG. 8 illustrates an example of a suitable computing system environment 800 on which aspects of the invention may be implemented. For example, the computing system environment 800 may be used to operate one or more actuators of mechanical linkages described above and/or to rotate a container about a fixed axis (e.g., an offset axis), etc. Such a computing environment may represent a home computer, a tablet, a mobile device, a server and/or any another computing device. In some embodiments, the computing environment may be, in whole or in part, contained within an additive fabrication device suitable for practicing the techniques described above. For instance, a processor and memory within an additive fabrication device may be configured to perform steps to form solid material in addition to operating actuators of mechanical linkages and/or rotating a container about a fixed axis.

The computing system environment 800 is only one example of a suitable computing environment and is not intended to suggest any limitation as to the scope of use or functionality of the invention. Neither should the computing environment 800 be interpreted as having any dependency or requirement relating to any one or combination of components illustrated in the exemplary operating environment 800.

Aspects of the invention are operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 8, an exemplary system for implementing aspects of the invention includes a general purpose computing device in the form of a computer 810. Components of computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 810. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable, volatile/nonvolatile computer storage media. By way of example only, FIG. 8 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through an non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies. A user may enter commands and information into the computer 810 through input devices such as a keyboard 862 and pointing device 861, commonly referred to as a mouse, trackball or touch pad. Other input devices (not shown) may include a microphone, joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a video interface 890. In addition to the monitor, computers may also include other peripheral output devices such as speakers 897 and printer 896, which may be connected through a output peripheral interface 895.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 8. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on memory device 881. It will be appreciated that the network connections shown are exemplary and other means of establishing a communications link between the computers may be used.

The various methods or processes outlined herein may be implemented in any suitable hardware. Additionally, the various methods or processes outlined herein may be implemented in a combination of hardware and of software executable on one or more processors that employ any one of a variety of operating systems or platforms. For example, the various methods or processes may utilize software to instruct a processor to activate one or more actuators to perform motions such as those described herein, such as motion of one or more regions of a container and/or of a build platform. Examples of such approaches are described above. However, any suitable combination of hardware and software may be employed to realize any of the embodiments discussed herein.

In this respect, various inventive concepts may be embodied as at least one non-transitory computer readable storage medium (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, implement the various embodiments of the present invention. The non-transitory computer-readable medium or media may be transportable, such that the program or programs stored thereon may be loaded onto any computer resource to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion among different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Various inventive concepts may be embodied as one or more methods, of which examples have been provided. For example, systems and methods for separating a part from a surface during additive fabrication have been provided herein. The acts performed as part of any method described herein may be ordered in any suitable way. Accordingly, embodiments may be constructed in which acts are performed in an order different than illustrated, which may include performing some acts simultaneously, even though these acts may have been shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein, unless clearly indicated to the contrary, should be understood to mean "at least one."

As used herein, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The phrase "and/or," as used herein, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting.

What is claimed is:

1. An additive fabrication device configured to form layers of material on a build platform, each layer of material being formed so as to contact a container in addition to the build platform and/or a previously formed layer of material, the additive fabrication device comprising:
   a build platform;
   a fixed platform;
   a container arranged between the fixed platform and the build platform;
   a plurality of mechanical linkages each independently coupled, via rotatable couplings, to the container and to the fixed platform; and
   at least one controller configured to, subsequent to formation of a layer of material in contact with the container, cause motion of the container relative to the fixed platform to separate the layer of material from the container.

2. The additive fabrication device of claim 1, wherein the plurality of mechanical linkages include at least a first mechanical linkage that comprises a linear actuator configured to increase or decrease a length of the first mechanical linkage.

3. The additive fabrication device of claim 2, wherein the at least one controller is configured to cause said motion of the container at least in part by actuating the linear actuator of the first mechanical linkage to increase or decrease the length of the first mechanical linkage.

4. The additive fabrication device of claim 2, wherein the at least one controller is configured to actuate the linear actuator of the first mechanical linkage to increase or decrease the length of the first mechanical linkage prior to formation of the layer of material in contact with the container.

5. The additive fabrication device of claim 1, wherein the plurality of mechanical linkages each include at least one actuator, and wherein the plurality of actuators are configured to be independently controlled.

6. The additive fabrication device of claim 5, wherein the plurality of actuators are configured to move the container in a direction perpendicular to a build direction of the additive fabrication device.

7. The additive fabrication device of claim 5, wherein the plurality of actuators are configured to rotate the container about an axis parallel to a build direction of the additive fabrication device.

8. The additive fabrication device of claim 5, wherein the at least one controller is configured to control the plurality of actuators.

9. The additive fabrication device of claim 1, wherein the at least one controller is configured to cause said motion of the container at least in part by applying a force to the build platform in a direction away from the container, thereby causing motion of the container as constrained by the mechanical linkages.

10. The additive fabrication device of claim 1, wherein each of the plurality of mechanical linkages includes a linear actuator, and wherein the linear actuators are configured to be independently controlled.

11. The additive fabrication device of claim 1, wherein the plurality of mechanical linkages comprises at least four of the mechanical linkages.

12. The additive fabrication device of claim 11, wherein the plurality of mechanical linkages comprises at least six of the mechanical linkages.

13. The additive fabrication device of claim 12, wherein the plurality of mechanical linkages form a Stewart platform.

14. The additive fabrication device of claim 1, further comprising a radiation source configured to direct radiation into the container.

* * * * *